US011878494B2

(12) United States Patent
Endo et al.

(10) Patent No.: US 11,878,494 B2
(45) Date of Patent: Jan. 23, 2024

(54) GAS BARRIER POLYAMIDE FILM

(71) Applicant: TOYOBO CO., LTD., Osaka (JP)

(72) Inventors: Takuro Endo, Inuyama (JP); Kosuke Hama, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 145 days.

(21) Appl. No.: 17/441,171

(22) PCT Filed: Mar. 10, 2020

(86) PCT No.: PCT/JP2020/010310
§ 371 (c)(1),
(2) Date: Sep. 20, 2021

(87) PCT Pub. No.: WO2020/195794
PCT Pub. Date: Oct. 1, 2020

(65) Prior Publication Data
US 2022/0161533 A1 May 26, 2022

(30) Foreign Application Priority Data
Mar. 28, 2019 (JP) .................................. 2019-063704

(51) Int. Cl.
*B32B 27/34* (2006.01)
*B32B 7/12* (2006.01)
*B32B 27/08* (2006.01)
*B65D 65/40* (2006.01)

(52) U.S. Cl.
CPC .............. *B32B 27/34* (2013.01); *B32B 7/12* (2013.01); *B32B 27/08* (2013.01); *B65D 65/40* (2013.01); *B32B 2250/24* (2013.01); *B32B 2255/10* (2013.01); *B32B 2255/20* (2013.01); *B32B 2270/00* (2013.01); *B32B 2307/518* (2013.01); *B32B 2307/558* (2013.01); *B32B 2307/7244* (2013.01); *B32B 2307/7265* (2013.01); *B32B 2307/732* (2013.01); *B32B 2439/00* (2013.01)

(58) Field of Classification Search
CPC ...................................................... B32B 27/34
See application file for complete search history.

(56) References Cited

U.S. PATENT DOCUMENTS

| 5,094,799 A | 3/1992 | Takashige et al. |
| 2019/0352530 A1 | 11/2019 | Khan et al. |

FOREIGN PATENT DOCUMENTS

| JP | S57-008647 B2 | 2/1982 |
| JP | H06-037081 B2 | 5/1994 |
| JP | 2000-006340 A | 1/2000 |
| JP | 2000-202968 A | 7/2000 |
| JP | 2000-238216 A | 9/2000 |
| JP | 2002-103446 A | 4/2002 |
| JP | 2004-181776 A | 7/2004 |
| JP | 2005-178805 A | 7/2005 |
| JP | 4178814 B2 | 11/2008 |
| JP | 2010-149380 A | 7/2010 |
| JP | 4660866 B2 | 3/2011 |
| JP | 5068084 B2 | 11/2012 |
| JP | 5383563 B2 | 1/2014 |
| TW | 201338980 A | 10/2013 |
| TW | 201823387 A | 7/2018 |

OTHER PUBLICATIONS

Machine Translation of JP 2010-149380 (Year: 2010).*
Machine Translation of JP 2000-202968 (Year: 2000).*
Intellectual Property India, Examination Report in Indian Patent Application No. 202147048147 (dated Sep. 15, 2022).
China National Intellectual Property Administration, First Office Action in Chinese Patent Application No. 202080024295X (dated Nov. 8, 2022).
European Patent Office, Extended European Search Report in European Patent Application No. 20779696.2 (dated Nov. 8, 2022).
Japanese Patent Office, International Search Report in International Patent Application No. PCT/JP2020/010310 (dated Jun. 2, 2020).
China National Intellectual Property Administration, Second Office Action in Chinese Patent Application No. 202080024295.X (dated Jun. 15, 2023).
Japan Patent Office, Office Action in Japanese Patent Application No. 2020-533038 (dated Aug. 1, 2023).
Taiwan Intellectual Property Office, First Office Action in Taiwanese Patent Application No. 109108705 (dated Jun. 17, 2023).
China National Intellectual Property Administration, Rejection Decision in Chinese Patent Application No. 202080024295.X (dated Sep. 23, 2023).

* cited by examiner

*Primary Examiner* — Zachary M Davis
(74) *Attorney, Agent, or Firm* — Leydig, Voit & Mayer, Ltd.

(57) ABSTRACT

The objective of the present invention is to provide a gas barrier polyamide film excellent in water resistance adhesiveness (water resistant laminate strength), impact resistance and pinhole resistance. The gas barrier polyamide film is characterized in comprising a stretched polyamide film, wherein the stretched polyamide film comprises A Layer: a base layer and B Layer: an easily adhesive layer on at least one surface of the A Layer, C Layer: an inorganic thin film layer is laminated on the surface of the B Layer in the stretched polyamide film, the A Layer comprises 65 mass % or more of Polyamide 6, the B Layer comprises 60 to 100 mass % of a Polyamide 6 copolymer and 0 to 40 mass % of Polyamide 6, and a ratio of a copolymer component in the Polyamide 6 copolymer is 3 to 35 mass %.

6 Claims, No Drawings

GAS BARRIER POLYAMIDE FILM

TECHNICAL FIELD

The present invention relates to a biaxially stretched polyamide film excellent in adhesiveness. In particular, the present invention relates to a biaxially stretched polyamide film excellent in water resistance adhesive strength and excellent in a gas barrier property.

BACKGROUND ART

A biaxially stretched polyamide film is used as a packaging material, particularly a material for packaging a food, since a biaxially stretched polyamide film is excellent in tensile strength, bending strength, pinhole resistance, oil resistance, an oxygen gas barrier property or the like.

In general, a heat-sealable polyolefin film such as polypropylene film is laminated on a biaxially stretched polyamide film, and the edges are sealed by heating to obtain a bag. Such a polyolefin film is also referred to as a sealant film, and such a bag is used as a packaging bag or the like. A biaxially stretched polyamide film is widely used as a material for packaging a food.

When a laminate film composed of a biaxially stretched polyamide film and a sealant film is used as a bag for a liquid soup and a liquid cargo, there are problems of weak adhesive strength between the laminated films and a peeling of the laminated film. The above adhesive strength is also referred to as laminate strength. In particular, there is a problem that laminate strength between a biaxially stretched polyamide film and a sealant film is drastically decreased by invading water between the laminated films after a hot water treatment at a high temperature for retort.

A method for improving laminate strength by coating the surface of a film to improve adhesive strength in a film production step is proposed in Patent document 1. The method, however, has problems of a bad productivity and a high production cost. In addition, the method has problems of a blocking and a defect such as a line defect and a scratch. Thus, a biaxially stretched polyamide film having high laminate strength even without coating has been required.

A laminated polyamide film produced by coextruding a layer containing a polyamide copolymer as a surface layer to obtain an unstretched sheet and biaxially stretching the unstretched sheet is proposed in Patent document 2. The laminate strength is improved by the above method, but the surface of the film must be coated in the film production step for high water resistant laminate strength.

A method for producing a biaxially stretched polyamide film that is composed of a Polyamide 6/66 copolymer and of which sequential stretching property is improved is proposed in Patent document 3.

In addition, a method for producing a biaxially stretched Polyamide 6/66 copolymer film excellent in thickness accuracy by a tubular method is proposed in Patent document 4.

The above biaxially stretched polyamide films composed of a Polyamide 6/66 copolymer are not suitable as a film for a packaging bag subjected to a boiling treatment and a retort treatment due to inferior heat resistance and inferior dimensional stability under a high temperature, since the melting points of the films are low in comparison with Polyamide 6 and Polyamide 66.

A five-layer biaxially stretched polyamide film produced by extruding a layer containing Polyamide 6 as a main component, a layer composed of Polyamide 6 and Polyamide 6/66, and a barrier layer containing an ethylene-vinyl acetate copolymer saponified material to be laminated is proposed in Patent document 5. The film, however, cannot be recovered at a clip gripper of a tenter to be recycled, since the film has a barrier layer containing an ethylene-vinyl acetate copolymer saponified material. A barrier layer composed of poly(meta-xylyleneadipamide) as a main component is proposed in Patent document 6. The film, however, has problems inferior impact resistance and inferior pinhole resistance.

PRIOR ART DOCUMENT

Patent Document

Patent document 1: JP 04660866 B
Patent document 2: JP 04178814 B
Patent document 3: JP S57-8647 B
Patent document 4: JP H6-37081 B
Patent document 5: JP 05068084 B
Patent document 6: JP 05383563 B

DISCLOSURE OF THE INVENTION

Problems to be Solved by the Invention

The objective of the present invention is to solve the above-described problems of the conventional biaxially stretched polyamide films and to provide a gas barrier biaxially stretched polyamide film excellent in adhesive strength, particularly water resistant laminate strength, at a low cost.

Means for Solving the Problems

The inventors of the present invention repeated intensive studies. As a result, the inventors found that the problems can be solved by forming an inorganic thin film layer on the surface of an easily adhesive layer of a laminated stretched polyamide film produced by laminating an easily adhesive layer containing a Polyamide 6 copolymer as a main component on a base layer containing Polyamide 6 as a main component.

The present invention is hereinafter described.

[1] A gas barrier polyamide film,
comprising a stretched polyamide film,
wherein the stretched polyamide film comprises A Layer: a base layer and B Layer: an easily adhesive layer on at least one surface of the A Layer,
C Layer: an inorganic thin film layer is laminated on the surface of the B Layer in the stretched polyamide film, the A Layer comprises 65 mass % or more of Polyamide 6, the B Layer comprises 60 to 100 mass % of a Polyamide 6 copolymer and 0 to 40 mass % of Polyamide 6, and a ratio of a copolymer component in the Polyamide 6 copolymer is 3 to 35 mass %.

[2] The gas barrier polyamide film according to [1], wherein the A Layer comprises 70 mass % or more of Polyamide 6.

[3] The gas barrier polyamide film according to [1] or [2], wherein the A Layer, the B Layer and the C Layer are laminated in the order of A Layer/B Layer/C Layer or B Layer/A Layer/B Layer/C Layer.

[4] The gas barrier polyamide film according to any one of [1] to [3], wherein the Polyamide 6 copolymer is a Polyamide 6/66 copolymer.

[5] The gas barrier polyamide film according to [4], wherein the A Layer comprises 0.5 to 30 mass % of the Polyamide 6/66 copolymer.

[6] The gas barrier polyamide film according to any one of [1] to [3], wherein the Polyamide 6 copolymer is a Polyamide 6/12 copolymer.

[7] The gas barrier polyamide film according to [6], wherein the A Layer comprises 0.5 to 30 mass % of the Polyamide 6/12 copolymer.

[8] The gas barrier polyamide film according to any one of claims 1 to 7, wherein a thickness of the laminated stretched polyamide film is 5 to 30 μm, a thickness of the A Layer is 4.5 μm or more, and a thickness of the B Layer is 0.5 μm or more.

[9] The gas barrier polyamide film according to any one of [1] to [8], wherein a water resistant laminate strength is 1.0 N/15 mm or more.

The gas barrier polyamide film of the present invention is excellent in tensile strength, impact strength, bending strength, pinhole resistance, oil resistance and an oxygen gas barrier property derived from a biaxially stretched polyamide film by the base layer (A Layer) containing 65 mass % or more and preferably 70 mass % or more of Polyamide 6.

In addition, the easily adhesive layer (B Layer) contributes to the above-described excellent properties due to the biaxially stretched polyamide film and extremely improves the laminate strength with the inorganic thin film layer and the sealant film. In particular, the water resistant laminate strength can be significantly improved.

Effect of the Invention

The gas barrier polyamide film of the present invention is effective for the prevention of breakage of a packaging bag for a liquid soup and a packaging bag for a liquid cargo due to impact and a vibration during transportation, since the gas barrier polyamide film is excellent in impact strength and pinhole resistance due to a biaxially stretched polyamide film and additionally excellent in a gas barrier property due to an inorganic thin film layer and water resistant laminate strength in the case where the gas barrier polyamide film is laminated with a sealant film.

In addition, the laminated stretched polyamide film of the present invention has advantages of economic efficiency in terms of an excellent productivity and less defect such as a scratch, since a coating step is not needed. The gas barrier polyamide film of the present invention has an advantage of being hygienic, since a coating agent is not laminated.

MODE FOR CARRYING OUT THE INVENTION

The present invention is hereinafter described in detail.
The gas barrier polyamide film of the present invention, comprises a stretched polyamide film,
wherein the stretched polyamide film comprises A Layer: a base layer and B Layer: an easily adhesive layer on at least one surface of the A Layer,
C Layer: an inorganic thin film layer is laminated on the surface of the B Layer in the stretched polyamide film,
the A Layer comprises 65 mass % or more, preferably 70 mass % or more, of Polyamide 6,
the B Layer comprises 60 to 100 mass % of a Polyamide 6 copolymer and 0 to 40 mass % of Polyamide 6, and
a ratio of a copolymer component in the Polyamide 6 copolymer is 3 to 35 mass %.

Laminated Stretched Polyamide Film

The laminated stretched polyamide film of the present invention is described.

An example of a lamination constitution of the laminated stretched polyamide film according to the present invention includes a constitution laminated in the order of A Layer/B Layer or B Layer/A Layer/B Layer.

A total thickness of the laminated stretched polyamide film according to the present invention is 5 to 30 μm. When the total thickness of the laminated stretched polyamide film is more than 30 μm, a strength property may be saturated. In addition, when the film is laminated with a sealant and processed into a packaging bag, flexibility may become worse.

A thickness of the base layer (A Layer) in the laminated stretched polyamide film of the present invention is 4.5 μm or more. When the thickness of the base layer (A Layer) is less than 4.5 μm, the film may not be processed by a printing machine and a bag-making machine due to wholly excessive softness. The lamination constitution of the laminated stretched polyamide film according to the present invention may be a constitution laminated in the order of B Layer/A Layer/B Layer/A Layer/B Layer and a further multi-layered constitution laminated in the order of A Layer/B Layer or B Layer/A Layer/B Layer in addition to the above-described constitution. A total thickness of the A Layers in such a case is preferably 4.5 μm or more.

A thickness of the easily adhesive layer (B Layer) in the laminated stretched polyamide film of the present invention is 0.5 μm or more. When the thickness of the B Layer is less than 0.5 μm, water resistant laminate strength as the objective of the present invention may not be obtained. The upper limit of the B Layer thickness is not particularly restricted; but the thickness of the B Layer is preferably 5 μm or less, since water resistant laminate strength may be saturated in the case where the thickness of the B Layer is more than 5 μm. The thickness of 0.5 μm or more needed by the easily adhesive layer (B Layer) is a thickness of the surface B Layer on which a sealant is laminated. A thickness of a layer other than the surface layer on which the inorganic thin film layer is formed may be less than 0.5 μm in the cases of constitutions laminated in the order of B Layer/A Layer/B Layer and B Layer/A Layer/B Layer/A Layer/B Layer.

The base layer (A Layer) of the laminated stretched polyamide film according to the present invention comprises 65 mass % or more of Polyamide 6 and preferably 70 mass % or more of Polyamide 6. When the content amount of Polyamide 6 is less than 65 mass %, sufficient impact strength, pinhole resistance, dimensional stability at a high temperature and transparency may not be obtained.

Polyamide 6 used for the base layer (A Layer) is generally produced by a ring-opening polymerization of ε-caprolactam. An ε-caprolactam monomer is generally removed from the Polyamide 6 produced by a ring-opening polymerization using hot water, and then the Polyamide 6 is dried and melt-extruded from an extruder.

The relative viscosity of Polyamide 6 is preferably 1.8 to 4.5 and more preferably 2.6 to 3.2. When the relative viscosity is less than 1.8, the impact strength of the film may be insufficient. When the relative viscosity is more than 4.5, an unstretched sheet may be difficult to be obtained due to a large load on an extruder.

The base layer (A Layer) may comprise 0.5 to 35 mass % of a Polyamide 6 copolymer. When the A Layer comprises a Polyamide 6 copolymer, adhesive strength between the A Layer and the B Layer can be improved. A copolymer component of the Polyamide 6 copolymer contained in the base layer (A Layer) is preferably the same as that of the Polyamide 6 copolymer in the B Layer.

The A Layer may comprise 0.5 to 30 mass % of Polyamide MXD6. Polyamide MXD6 is poly(m-xylylene adipamide). When the A Layer comprises Polyamide MXD6, the stretchability can become excellent. As a result, a film can be prevented from being broken and the unevenness of a film thickness can be reduced during the film production.

The A Layer may comprise 0.5 to 30 mass % of a polyamide elastomer or a polyolefin elastomer. When the A Layer comprises a polyamide elastomer or a polyolefin elastomer, the pinhole resistance can become excellent.

An example of the polyamide elastomer to be used includes a polyamide elastomer consisting of a hard segment of Nylon 12 and a soft segment of poly(tetramethylene glycol).

An example of the polyolefin elastomer to be used includes a block copolymer containing a hard segment of a polyolefin and a soft segment of various rubber components. An example of the polyolefin that constitutes the hard segment includes ethylene, propylene, 1-butene, 1-pentene and 4-methyl-1-pentene. An example of the rubber component that constitutes the soft segment includes ethylene-propylene rubber (EPR), ethylenepropylenediene rubber (EPDM) and polybutadiene.

The easily adhesive layer (B Layer) of the laminated stretched polyamide film according to the present invention comprises 60 to 100 mass % of a Polyamide 6 copolymer, and a ratio of a copolymer component in the Polyamide 6 copolymer is 3 to 35 mass %.

When a content amount of the Polyamide 6 copolymer in the easily adhesive layer (B Layer) is less than 60 mass %, sufficient water resistant laminate strength may not be obtained.

A ratio of a copolymer component in the above Polyamide 6 copolymer is 3 to 35 mass %.

When the ratio of the copolymer component is less than 3 mass %, sufficient water resistant laminate strength may not be obtained.

When the ratio of the copolymer component in the copolymer is more than 35 mass %, a handling at the time of a raw material supplying may become difficult in some cases.

A melting point of the above Polyamide 6 copolymer is preferably 170 to 220° C., more preferably 175 to 215° C., and even more preferably 180 to 210° C. When the melting point of the Polyamide 6 copolymer is higher than 215° C., sufficient water resistant adhesiveness may not be obtained in some cases. When the melting point of the Polyamide 6 copolymer is lower than 170° C., a handling at the time of a raw material supplying may become difficult in some cases.

The Polyamide 6 copolymer used for the above easily adhesive layer (B Layer) can be prepared by copolymerizing ε-caprolactam or aminocaproic acid with a copolymer component in a ratio of 3 to 35 mass %. The ratio of the copolymerization means mass % after a remaining monomer is removed using hot water or the like subsequent to the copolymerization.

A component to be copolymerized with ε-caprolactam can be prepared by, for example, copoymerizing a salt of a diamine with a lactam other than ε-caprolactam, an amino acid other than aminocaproic acid or a dicarboxylic acid. A monomer that is copolymerized with ε-caprolactam in the copolymerization for the Polyamide 6 copolymer is exemplified by undecanelactam, lauryl lactam, aminoundecanoic acid, aminolauric acid, adipic acid, pimelic acid, azelaic acid, sebacic acid, terephthalic acid, isophthalic acid, hexamethylendiamine, nonanediamine, decanediamine, methylpentanediamine, m-xylylenediamine and trimethylhexamethylenediamine.

An example of the Polyamide 6 copolymer includes Polyamide 6/66 copolymer, Polyamide 6/12 copolymer, Polyamide 6/6T copolymer, Polyamide 6/610 copolymer, Polyamide 6/6I copolymer, Polyamide 6/9T copolymer, Polyamide 6/6I copolymer and Polyamide 6/11 copolymer.

The Polyamide 6/66 copolymer used for the easily adhesive layer (B Layer) can be prepared by polymerizing ε-caprolactam with an adipate hexamethylenediammonium salt.

A commercially available product such as Ultramid C3301 manufactured by BASF and Nylon 5023B manufactured by Ube Industries can be also used.

The above Polyamide 6/66 copolymer can be also used as the Polyamide 6/66 copolymer that may be contained in the A Layer in a ratio of 0.5 to 30 mass %.

A ratio of the Polyamide 66 in the Polyamide 6/66 copolymer is 3 to 35 mass %, preferably 5 to 30 mass % and more preferably 5 to 25 mass % with respect to copolymerization ratios of the Polyamide 6 and the Polyamide 66 in the Polyamide 6/66 copolymer.

When the ratio of the Polyamide 66 in the Polyamide 6/66 copolymer is less than 3 mass %, easy adhesiveness as the objective of the present invention may not be expressed.

When the ratio of the Polyamide 66 in the Polyamide 6/66 copolymer is more than 35 mass %, the crystallinity of the copolymer may become low and the copolymer may become difficult to be treated in some cases.

The relative viscosity of the Polyamide 6/66 copolymer is preferably 1.8 to 4.5 and more preferably 2.6 to 3.2.

The Polyamide 6/12 copolymer used for the easily adhesive layer (B Layer) can be obtained by polymerizing ε-caprolactam and ω-lauryl lactam.

A commercially available product such as nylon resin 7024B manufactured by Ube Industries can be also used.

The above Polyamide 6/12 copolymer can be also used as the Polyamide 6/12 copolymer that may be contained in the A Layer in a ratio of 0.5 to 30 mass %.

A ratio of the Polyamide 12 in the Polyamide 6/12 copolymer is 3 to 35 mass %, preferably 5 to 30 mass % and more preferably 5 to 25 mass % with respect to copolymerization ratios of the Polyamide 6 and the Polyamide 12 in the Polyamide 6/12 copolymer.

When the ratio of the Polyamide 12 in the Polyamide 6/12 copolymer is less than 3 mass %, the easy adhesiveness as the objective of the present invention may not be expressed.

When the ratio of the Polyamide 12 in the Polyamide 6/12 copolymer is more than 35 mass %, the crystallinity of the copolymer may become low and the copolymer may become difficult to be treated in some cases.

The relative viscosity of the Polyamide 6/12 copolymer is preferably 1.8 to 4.5 and more preferably 2.5 to 4.0.

It is important point for the present invention that the crystallinity of the surface on which the inorganic thin film layer is formed is reduced by laminating the easily adhesive layer (B Layer) containing a Polyamide 6 copolymer on the base layer (A Layer).

A method for laminating the easily adhesive layer (B Layer) containing the polyamide copolymer on the base layer (A Layer) is preferably a coextrusion method using a feed block and a multi-manifold. A dry laminate method, an extrusion laminate method or the like may be selected other than a coextrusion method.

When the A layer and the B layer are laminated by a coextrusion method, the relative viscosities of the polyamides used for the A layer and the B layer is preferably selected so that the difference of the melt viscosities of the A layer and the B layer becomes smaller.

Any one of a sequentially biaxially stretching method and a simultaneously stretching method can be used as a stretching method to produce the laminated stretched polyamide film of the present invention. A sequentially biaxially stretching method is more preferred, since the method is advantageous from the viewpoint of a production cost due to an increased film production speed. The film may be a uniaxial stretched film produced by a uniaxial stretching, and a uniaxial stretched polyamide film having excellent laminate strength can be obtained. The biaxially stretched polyamide film has more excellent impact resistance and pinhole resistance.

A general sequentially biaxially stretching apparatus can be used as an apparatus. With respect to a production condition, an extrusion temperature is preferably 200° C. to 300° C., a stretching temperature in a machine direction of an apparatus (abbreviated as MD in some cases) is preferably 50 to 100° C., a stretching ratio in a machine direction is preferably 2 to 5 times, a stretching temperature in a transverse direction of an apparatus (abbreviated as TD in some cases) is preferably 120 to 200° C., a stretching ratio in a transverse direction is preferably 3 to 5 times, and a heat fixing temperature is preferably adjusted to a range of 200° C. to 230° C.

A stretching ratio among a stretching condition of the laminated stretched polyamide film according to the present invention is preferably 2.8 times or more in a machine direction and a transverse direction respectively and more preferably 3.2 times or more in a transverse direction. In addition, a higher heat fixation temperature is preferred, since higher water resistant laminate strength is tended to be obtained. When the heat fixation temperature is lower than 200° C., sufficient water resistant laminate strength and sufficient heat dimensional stability may not be obtained in some cases.

The film may be subjected to a corona treatment, a flame treatment, an anchor coating treatment or the like in order to further improve the adhesive strength between the inorganic thin film layer and the easily adhesive layer (B Layer).

The easily adhesive layer (B Layer) and/or the base layer (A Layer) of the laminated stretched polyamide film according to the present invention may contain various additives such as a lubricant, a blocking inhibitor, a heat stabilizer, an antioxidant, an antistatic agent, a light resistant agent and an impact resistance improver as long as a property such as water resistant laminate strength is not inhibited.

In particular, it is preferred to add an organic lubricant having an effect to reduce a surface energy, such as ethylenebisstearamide (EBS), since the sliding performance of the film may become good. In addition, an inorganic fine particle such as a silica fine particle is preferably added as a blocking inhibitor.

The Haze value of the laminated stretched polyamide film and the gas barrier polyamide film of the present invention is preferably 5.0% or less, more preferably 4.0% or less and even more preferably 2.5% or less. When the Haze value is more than 5.0%, the transparency may become worse and such a film may not be suitable as a packaging material having a good design.

Inorganic Thin Film Layer (C Layer)

The gas barrier polyamide film of the present invention can be produced by laminating the inorganic thin film layer (C Layer) on the surface of the biaxially stretched polyamide film of the present invention.

The inorganic thin film layer is a thin film composed of a metal or an inorganic oxide. A raw material of the inorganic thin film layer is not particularly restricted as long as the raw material can be formed into a thin film, and is preferably exemplified by an inorganic oxide such as a silicon oxide such as silica, an aluminum oxide such as alumina, and a mixture of a silicon oxide and an aluminum oxide from the viewpoint of a gas barrier property. In particular, a complex oxide of a silicon oxide and an aluminum oxide is preferred from the viewpoint of the compatibility between the flexibility and the denseness of the thin film layer. A mass ratio of a metal Al is preferably adjusted to the range of 20 to 70 mass % with respect to a mixing ratio of a silicon dioxide and an aluminum oxide in the complex oxide. When the Al concentration is less than 20 mass %, a barrier property against water vapor may become low in some cases. On the one hand, when the Al concentration is more than 70 mass %, the inorganic thin film layer tends to become hard and the gas barrier property may be deteriorated due to the broken layer at the time of a secondary processing such as printing and laminating. The above-described silicon oxide means various silicon oxides such as SiO and $SiO_2$ or a mixture thereof, and the aluminum oxide means various aluminum oxides such as AlO and $Al_2O_3$ or a mixture thereof.

The thickness of the inorganic thin film layer is generally 1 to 100 nm and preferably 5 to 50 nm. When the thickness of the inorganic thin film layer is less than 1 nm, a satisfactory gas barrier property may become difficult to be obtained. On the one hand, when the thickness is excessively thick as more than 100 nm, an effect to improve a gas barrier property commensurate therewith may not be obtained and such a thickness may become disadvantageous in terms of flex resistance and a production cost.

A method for forming the inorganic thin film layer is not particularly restricted, and a publicly known vapor deposition method such as a physical vapor deposition method (PVD method) and a chemical vapor deposition (CVD method) may be appropriately used. An example of a PVD method includes a vacuum vapor deposition method, a sputtering method and an ion plating method. A typical method to form the inorganic thin film layer is hereinafter described with a silicon oxide/aluminum oxide thin layer as an example. For example, a mixture of $SiO_2$ and $Al_2O_3$ or a mixture of $SiO_2$ and Al is preferably used as a deposition raw material in the case of a vacuum vapor deposition method. In general, a particle is usually used as such a deposition raw material. A size of the particle is preferably adjusted so that a pressure for deposition is not changed at the time. The preferred particle diameter is 1 mm to 5 mm. A heating method such as resistance heating, high-frequency induction heating, electron beam heating and laser heating can be used for heating. A reaction gas such as oxygen, nitrogen, hydrogen, argon, carbon dioxide and water vapor can be supplied. A reactive deposition using a means such as ozone addition and ion assist can be also used.

A film formation condition can be optionally changed. For example, the substrate, i.e. the laminated film to be vapor-deposited, may be biased, and the substrate may be heated or cooled. When a sputtering method and a CVD method are used, the above-described deposition raw material, reaction gas, bias to the substrate, heating and cooling can be similarly changed.

Protective Layer

A protective layer may be formed on the inorganic thin film layer (C Layer) in the present invention. The inorganic thin film layer may not be a completely dense layer and may have scattering fine defects in some cases. Accordingly, a protective layer is formed on the inorganic thin film layer by applying a specific resin composition for a protective layer described later to fill the defect of the inorganic thin film layer with the resin of the resin composition for a protective layer; as a result, an effect to stabilize a gas barrier property can be obtained. In addition, a gas barrier property of the laminated film is significantly improved by using a material having a gas barrier property for the protective layer.

A resin composition used for forming the protective layer on the inorganic thin film layer of the gas barrier polyamide film layer according to the present invention is exemplified by a composition prepared by adding a hardener to a resin. An example of the resin includes urethane resin, polyester resin, acrylate resin, titanate resin, isocyanate resin, imine resin and polybutadiene resin. An example of the hardener includes epoxy hardener, isocyanate hardener and melamine hardener.

The above-described urethane resin is preferred, since a damage to the inorganic thin film layer can be controlled even when a bending load is imposed due to flexibility based on the existence of an amorphous part and an interaction between the polar group of the urethane bond and the inorganic thin film layer.

The acid value of the above-described urethane resin is preferably adjusted to the range of 10 to 60 mgKOH/g, more preferably 15 to 55 mgKOH/g and even more preferably 20 to 50 mgKOH/g. When the acid value of the urethane resin is included in the above-described range, the liquid stability in the case of a water suspension thereof is improved. In addition, the coating appearance becomes excellent, since the protective layer can be uniformly deposited on the highly polar inorganic thin film.

The glass transition temperature (Tg) of the above-described urethane resin is preferably 80° C. or higher and more preferably 90° C. or higher. When the Tg is adjusted to 80° C. or higher, the swelling of the protective layer due to a molecular motion during a wet heating process, i.e. increasing temperature—heat retention—decreasing temperature, can be reduced.

A urethane resin containing an aromatic or an aromatic aliphatic diisocyanate component as a main constituent component is more preferably used as the above-described urethane resin from the viewpoint of the improvement of the gas barrier property.

In particular, the urethane resin preferably contains m-xylylene diisocyanate component. When such a resin is used, the cohesion of the urethane bond can be further improved due to a stacking effect between the aromatic rings and as result, an excellent gas barrier property can be obtained.

The ratio of the aromatic or aromatic aliphatic diisocyanate in the urethane resin is preferably adjusted to the range of 50 mol % or more, i.e. 50 to 100 mol %, to 100 mol % of polyisocyanate component (F) in the present invention. The ratio of the total amount of the aromatic or aromatic aliphatic diisocyanate is preferably 60 to 100 mol %, more preferably 70 to 100 mol % and even more preferably 80 to 100 mol %. A commercially available "TAKELAC (registered trademark) WPB" series manufactured by Mitsui Chemicals is preferably used as such a resin. When the ratio of the total amount of the aromatic or aromatic aliphatic diisocyanate is less than 50 mol %, an excellent gas barrier property may not be obtained in some cases.

The above-described urethane resin preferably has a carboxylic acid group, i.e. carboxy group, from the viewpoint of the improvement of the affinity for the inorganic thin film layer. For example, a polyol compound having a carboxylic acid group, such as dimethylolpropionic acid and dimethylolbutanoic acid, may be introduced as a copolymerization component in order to introduce a carboxylic acid group or a carboxylate group in the urethane resin. When the synthesized carboxylic acid group-containing urethane resin is neutralized using a salt forming agent, an aqueous dispersion of the urethane resin can be obtained. A specific example of the salt forming agent includes ammonia; a trialkylamine such as trimethylamine, triethylamine, triisopropylamine, tri-n-propylamine and tri-n-butylamine; an N-alkylmorpholine such as N-methylmorpholine and N-ethylmorpholine; and an N-dialkylalkanolamine such as N-dimethylethanolamine and N-diethylethanolamine. One salt forming agent may be used alone, or 2 or more salt forming agents may be used in combination.

An example of the solvent includes an aromatic solvent such as benzene and toluene; an alcohol solvent such as methanol and ethanol; a ketone solvent such as acetone and methyl ethyl ketone; an ester solvent such as ethyl acetate and butyl acetate; and a polyol derivative such as ethylene glycol monomethyl ether.

Packaging Material

The gas barrier polyamide film of the present invention can be preferably used as a packaging material. When the film is used as a packaging material, a heat-sealable resin layer referred to as a sealant is preferably formed. Such a heat-sealable resin layer is generally formed on the inorganic thin film layer but may be formed on the opposite side to the inorganic thin film layer in some cases. The heat-sealable resin layer is formed by an extrusion laminate method and a dry laminate method. A thermoplastic polymer to form the heat-sealable resin layer is not restricted as long as sealant adhesiveness is sufficiently expressed, and polyethylene resin such as HDPE, LDPE and LLDPE, polypropylene resin, ethylene-vinyl acetate copolymer, ethylene-α-olefin random copolymer, ionomer resin or the like may be used.

At least one layer such as a printing layer, other plastic base material and/or paper base material may be laminated between the inorganic thin film layer or the base material film layer and the heat-sealable resin layer or on the outer side thereof of the gas barrier polyamide film according to the present invention.

A packaging material containing the gas barrier polyamide film of the present invention can be widely used for a packaging application for food, pharmaceutical product, industrial product or the like, and for an industrial application for solar cell, electronic paper, organic EL element, semiconductor element or the like, since the film is excellent in a gas barrier property and bag breakage resistance.

EXAMPLES

Hereinafter, the present invention is specifically described with Examples and is not restricted to the Examples without departing from the scope of the invention.

The film was evaluated on the basis of the following measurement methods. The film was subjected to the measurements in a room under an atmosphere of 23° C. and 65% relative humidity unless otherwise described.

(1) Thickness of Film

The ten films were stacked and cut into ten equal parts in the transverse direction (TD) and in the length of 100 mm in the machine direction. The film having a narrow width was equally cut so that the width by which the thickness could be measured was ensured. The cut film was conditioned under an environment of 23° C. and 65% relative humidity for 2 hours or more. The thickness at the middle of each sample was measured using a thickness gauge manufactured by TESTER SANGYO, and an average value thereof was regarded as a thickness.

Thicknesses of the base layer (A Layer) and the easily adhesive layer (B Layer) were calculated from the total thickness of the laminated stretched polyamide film measured by the above-described method and a ratio of the measured extrusion amounts of the base layer (A Layer) and the easily adhesive layer (B Layer).

(2) Heat Shrinkage Rate of Film

Five films having a size of width 20 mm×length 250 mm were cut out in the machine direction (MD) and the transverse direction (TD) respectively as test samples. Gauge lines were marked at the interval of 200 mm±2 mm centering around the central part of each test sample. The interval of the gauge lines of the test sample was measured with 0.1 mm accuracy before heating. The test sample was hung under no load in a hot air dryer ("PHH-202" manufactured by ESPEC) to be subjected to a heat treatment in the heating condition at 160° C. for 10 minutes. The test sample was taken out from the constant temperature reservoir and cooled down to room temperature. Then, the length and the width were measured at the same site where the length and the width were firstly measured. Dimensional change rates of each test sample in the machine direction and the transverse direction were calculated as a percentage to an initial dimensional change. A dimensional change rate in each direction was an average of the measurement values in the direction.

(3) Impact Strength of Film

Impact strengths were measured 10 times under the circumstances of temperature of 23° C. and relative humidity of 65% using a film impact tester manufactured by Toyo Seiki Seisaku-sho. The impact strength was evaluated by the average value of the measurement values. An impact ball having a diameter of ½-inch was used. A strength per 15 μm, i.e. J/15 μm, was used as a unit.

(4) Pinhole Resistance

The number of pinholes was measured using a Gelbo flex tester BE1006 with a constant temperature reservoir manufactured by TESTER SANGYO in accordance with the following method.

After a polyester adhesive which was prepared by mixing TM-569 (product name) and CAT-10L (product name) manufactured by Toyo-Morton in a ratio of 7.2/1 by mass and of which solid content concentration was 23% was applied on the inorganic thin film layer surface of the gas barrier polyamide film so that the resin solid content after drying became 3.2 g/m², a linear low density polyethylene film (L-LDPE film, "LIX (registered trademark) L4102" manufactured by TOYOBO) 40 μm was dry-laminated thereon, and aging was carried out under the circumstance of 40° C. for 2 days to obtain a laminate film.

The obtained dry laminate film was cut into a size of 28.0 cm (11 inch)×24.0 cm (9.4 inch). The cut film was conditioned by placing the film in the condition of a temperature of 23° C. and a relative humidity of 50% for 6 hours or more. Then, the rectangular test film was wound to be cylindrical having a diameter of 8.9 cm (3.5 inch). The one edge of the cylindrical film was fixed on the circumference of the discotic fixation head of the Gelbo flex tester, and the other edge of the cylindrical film was fixed on the circumference of the discotic movable head of the tester opposite to the fixation head at an interval of 19.4 cm (7.6 inch). The movable head was rotated 440° while the movable head was approached to the fixation head by 7.6 cm (3.5 inch) along the axles of the both heads parallelly opposite to each other, straightly moved by 6.4 cm (2.5 inch) without rotation, and then returned to the initial position by the inverse movement as 1 cycle. The cycle was continuously repeated 1000 times at 1° C. and at a rate of 40 cycles per 1 minute for a flex test. Then, the number of pinholes was counted in the area of 19.4 cm (7.6 inch)×25.5 cm (11 inch) other than the part of the tested film fixed on the circumferences of the fixation head and the movable head. In other words, the number of pinholes per 495 cm² (77 square inch) was counted.

(5) Water Resistant Laminate Strength (Laminate Strength Under Water Adhesion Condition)

A laminate film was prepared by a similar method to the method described in the evaluation of the pinhole resistance and cut into a rectangle of a width of 15 mm×a length of 200 mm. The one edge of the laminate film was peeled at the interface between the biaxially stretched polyamide film and the linear low density polyethylene film, and a laminate strength was measured three times using AUTOGRAPH manufactured by SHIMADZU CORPORATION in the condition of a temperature of 23° C., a relative humidity of 50%, a pulling rate of 200 mm/min and a peeling angle of 90° while water was added dropwise at the peeled interface of the rectangle laminate film. Water resistant laminate strength was evaluated as an average value of the measurement values.

(6) Oxygen Transmission Rate of Laminate Film

A laminate film was prepared by a similar method to the method described in the evaluation of the pinhole resistance, and an oxygen transmission rate of the laminate film was measured in a normal state using an oxygen transmission rate tester ("OX-TRAN 2/20" manufactured by MOCON) under an atmosphere of a temperature of 23° C. and a relative humidity of 65% in accordance with Appendix A of the electrolysis sensor method of JIS-K7126-2. An oxygen transmission rate was measured in the direction that oxygen was transmissive from the base layer side to the sealant layer side.

(7) Relative Viscosity of Raw Material Polyamide

In a 25 ml measuring flask, 0.25 g of polyamide was dissolved in 96% sulfuric acid in a concentration of 1.0 g/dl. A relative viscosity of the polyamide solution was measured at 20° C.

(8) Melting Point of Raw Material Polyamide

An endothermic peak temperature (Tmp) was measured as a melting point in a nitrogen atmosphere in the conditions of sample weight: 10 mg, heat-starting temperature: 30° C. and temperature raising rate: 20° C./min using SSC5200 type differential scanning calorimeter manufactured by Seiko Instruments in accordance with JIS K7121.

Example 1-1

Preparation of Laminated Biaxially Stretched Polyamide Film

An apparatus containing two extruders having an aperture of 60 mm and an aperture of 25 mm and a coextrusion T-die having a width of 380 mm was used. Polyamide 6 (relative viscosity: 2.8, Melting point: 220° C.) was melted and extruded as the base layer (A Layer) from the extruder having an aperture of 60 mm. A mixture of Polyamide 6 (relative viscosity: 2.8, Melting point: 220° C.) and Polyamide 6/66 copolymer (ratio of Polyamide 66:7 mass %, relative viscosity: 2.8, Melting point: 198° C.) in a ratio of 9/91 by mass was melted and extruded as the easily adhesive layer (B Layer) from the extruder having an aperture of 25 mm. The resins were extruded from the T-die into a sheet using a feed block to be laminated into a constitution of base layer (A Layer)/easily adhesive layer (B Layer) and adhered on a cooling roll of which temperature was adjusted to 20° C. to obtain a laminated unstretched sheet having a thickness of 200 μm.

The raw material was dried so that a moisture percentage became 0.1 mass % to be used. In addition, 0.1 mass % of a higher fatty acid amide and 0.5 mass % of silica fine particle were added in the easily adhesive layer (B Layer).

The produced laminated unstretched sheet was supplied to a roll-type stretching machine to be stretched 1.7 times in the machine direction at 80° C. by utilizing the difference of the circumferential velocities of the rolls. Then, the sheet was further stretched 1.85 times at 70° C. Subsequently, the uniaxially stretched film was continuously supplied to a tenter-type stretching machine and preliminarily heated at 110° C. Next, the film was stretched 1.2 times at 120° C., 1.7 times at 130° C. and 2.0 times at 160° C. in the machine direction (MD), and fixed by heat at 210° C. The film was relaxed at 210° C. by 3% and at 185° C. by 2%, and then the surface of the easily adhesive layer (B Layer) was subjected to a corona discharge treatment to obtain a 2 kinds and 3 layers laminated biaxially stretched polyamide film laminated in the order of B Layer/A Layer/B Layer.

A construction of the feed block and an extrusion amount of the extruder were adjusted so that the total thickness of the laminated stretched polyamide film became 15 μm, the thickness of the base layer (A Layer) became 13.5 μm and the thickness of the easily adhesive layer (B Layer) became 1.5 μm.

An inorganic thin film layer and a protective layer were formed on the slit laminated biaxially stretched polyamide film by the following method to obtain a gas barrier polyamide film.

Formation of Inorganic Thin Film Layer

A complex oxide layer of silicon dioxide and aluminum oxide was formed as an inorganic thin film layer on the slit film by electron beam evaporation method. Particulate $SiO_2$ (purity: 99.9%) and $Al_2O_3$ (purity: 99.9%) having a diameter of about 3 mm to 5 mm were used as evaporation sources. The thickness of the inorganic thin film layer, i.e. $SiO_2$/$Al_2O_3$ composite oxide layer, in the thus produced film, i.e. film containing inorganic thin film layer/adhesive layer, was 13 nm. The composition of the complex oxide layer was $SiO_2$/$Al_2O_3$=60/40 by mass ratio.

Formation of Protective Layer

The following coating liquid was applied on the inorganic thin film layer formed by the above-described evaporation coating by wire bar coating method and dried at 200° C. for 15 seconds to obtain a protective layer. A coating amount after drying was 0.190 g/m² as a dried solid.

Composition of Coating Liquid Used for Coating Protective Layer

| | |
|---|---|
| water | 60.00 mass % |
| isopropanol | 30.00 mass % |
| urethane resin | 10.00 mass % |

A dispersion of m-xylylene group-containing urethane resin ("TAKELEC (registered trademark) WPB341" manufactured by Mitsui Chemicals; solid content: 30%) was used as the urethane resin.

Thus, a gas barrier polyamide film having base layer (A Layer)/easily adhesive layer (B Layer)/inorganic thin film layer (C Layer)/protective layer was produced as described above.

The film forming conditions, properties and evaluation results of the produced laminated biaxially stretched polyamide film and the gas barrier polyamide film are shown in Table 1.

Example 1-2

A laminated biaxially stretched polyamide film was produced, and an inorganic thin film layer and a protective layer were formed similarly to Example 1-1 except that a mixture of Polyamide 6 and Polyamide 6/66 copolymer in a mass ratio of 95/5 was melted and extruded as the base layer (A Layer), and a mixture of Polyamide 6 and Polyamide 6/66 copolymer in a mass ratio of 15/85 was melted and extruded as the easily adhesive layer (B Layer).

Example 1-3

A laminated biaxially stretched polyamide film was produced, and an inorganic thin film layer and a protective layer were formed similarly to Example 1-2 except that a mixture of Polyamide 6 and Polyamide 6/66 copolymer in a mass ratio of 30/70 was melted and extruded as the easily adhesive layer (B Layer).

Example 1-4

A laminated biaxially stretched polyamide film was produced, and an inorganic thin film layer and a protective layer were formed similarly to Example 1-2 except that a mixture of Polyamide 6 and Polyamide 6/66 copolymer in a mass ratio of 40/60 was melted and extruded as the easily adhesive layer (B Layer).

Example 1-5

A laminated biaxially stretched polyamide film was produced, and an inorganic thin film layer and a protective layer were formed similarly to Example 1-2 except that Polyamide 6/66 copolymer having a larger copolymerization ratio of Polyamide 66 (ratio of Polyamide 66:25 mass %, relative viscosity: 2.7, melting point: 187° C.) was mixed in a mass ratio of 15/85 in place of Polyamide 6/66 copolymer (ratio of Polyamide 66:7 mass %, relative viscosity: 2.8, melting point: 198° C.)

Comparative Example 1-1

A laminated biaxially stretched polyamide film was produced, and an inorganic thin film layer and a protective layer were formed similarly to Example 1-2 except that a mixture of Polyamide 6 and Polyamide 6/66 copolymer in a mass ratio of 65/35 was melted and extruded as the easily adhesive layer (B Layer).

Comparative Example 1-2

A laminated biaxially stretched polyamide film was produced, and an inorganic thin film layer and a protective layer were formed similarly to Example 1-2 except that a mixture of Polyamide 6 and Polyamide 6/66 copolymer in a mass ratio of 50/50 was melted and extruded as the easily adhesive layer (B Layer).

Water resistant laminate strength and other properties of the gas barrier polyamide film prepared in Example 1-1 to Example 1-5 and Comparative example 1-1 and Comparative example 1-2 are shown in Table 1.

TABLE 1

|  |  |  | Examples |  |  |  |  | Comparative examples |  |
|---|---|---|---|---|---|---|---|---|---|
|  |  |  | 1-1 | 1-2 | 1-3 | 1-4 | 1-5 | 1-1 | 1-2 |
| Easily adhesive layer | NY6/66 | mass % | 91 | 85 | 70 | 60 | 85 | 35 | 50 |
| (B Lyer) | NY6 | mass % | 9 | 15 | 30 | 40 | 15 | 65 | 50 |
| Base layer (A Layer) | NY6 | mass % | 100 | 95 | 95 | 95 | 95 | 95 | 95 |
|  | NY6/66 | mass % | 0 | 5 | 5 | 5 | 5 | 5 | 5 |
| Impact strength |  | J/15 μm | 1.0 | 1.1 | 1.0 | 1.2 | 1.1 | 1.1 | 1.1 |
| Heat shrinkage rate (MD) |  | % | 0.9 | 1.0 | 1.0 | 0.9 | 1.1 | 1.0 | 1.0 |
| Heat shrinkage rate (TD) |  | % | 1.3 | 1.2 | 1.3 | 1.2 | 1.3 | 1.2 | 1.1 |
| Pinhole resistance |  | Number | 4 | 3 | 2 | 2 | 4 | 2 | 3 |
| Water resistant laminate strength |  | N/15 mm | 1.3 | 1.2 | 1.2 | 1.1 | 1.2 | 0.4 | 0.5 |
| Oxygen transmission rate |  | ml/m$^2$ · day · MPa | 3.1 | 3.2 | 3.0 | 3.3 | 3.4 | 3.8 | 3.6 |

It is clear from the results shown in Table 1 that sufficient water resistant laminate strength can be obtained in the case where 60 mass % or more of 6/66 copolymer is contained in the easily adhesive layer (B Layer) as Example 1-1 to Example 1-5.

On the one hand, sufficient water resistant laminate strength cannot be obtained in the case where a content amount of Polyamide 6/66 copolymer in the easily adhesive layer is small as Comparative example 1-1 and Comparative example 1-2.

Example 2-1

A laminated biaxially stretched polyamide film was produced, and an inorganic thin film layer and a protective layer were formed similarly to Example 1-1 except that Polyamide 6/12 copolymer (7024B manufactured by Ube Industries, relative viscosity: 2.6, melting point: 201° C.) was mixed in a mass ratio of 9/91 in place of Polyamide 6/66 copolymer (ratio of Polyamide 66:7 mass %, relative viscosity: 2.8, melting point: 198° C.)

Example 2-2

A laminated biaxially stretched polyamide film was produced, and an inorganic thin film layer and a protective layer were formed similarly to Example 2-1 except that a mixture of Polyamide 6 and Polyamide 6/12 copolymer in a mass ratio of 95/5 was melted and extruded as the base layer (A Layer) and a mixture of Polyamide 6 and Polyamide 6/Polyamide 12 copolymer in a mass ratio of 15/85 was melted and extruded as the easily adhesive layer (B Layer).

Example 2-3

A laminated biaxially stretched polyamide film was produced, and an inorganic thin film layer and a protective layer were formed similarly to Example 2-2 except that a mixture of Polyamide 6 and Polyamide 6/12 copolymer in a mass ratio of 30/70 was melted and extruded as the easily adhesive layer (B Layer).

Example 2-4

A laminated biaxially stretched polyamide film was produced, and an inorganic thin film layer and a protective layer were formed similarly to Example 2-2 except that a mixture of Polyamide 6 and Polyamide 6/12 copolymer in a mass ratio of 40/60 was melted and extruded as the easily adhesive layer (B Layer).

Comparative Example 2-1

A laminated biaxially stretched polyamide film was produced, and an inorganic thin film layer and a protective layer were formed similarly to Example 2-2 except that a mixture of Polyamide 6 and Polyamide 6/12 copolymer in a mass ratio of 65/35 was melted and extruded as the easily adhesive layer (B Layer).

Comparative Example 2-2

A laminated biaxially stretched polyamide film was produced, and an inorganic thin film layer and a protective layer were formed similarly to Example 2-2 except that a mixture of Polyamide 6 and Polyamide 6/12 copolymer in a mass ratio of 50/50 was melted and extruded as the easily adhesive layer (B Layer).

Water resistant laminate strength and other properties of the gas barrier polyamide film prepared in Example 2-1 to Example 2-4 and Comparative example 2-1 and Comparative example 2-2 are shown in Table 2.

TABLE 2

|  |  |  | Examples | | | | Comparative examples | |
| --- | --- | --- | --- | --- | --- | --- | --- | --- |
|  |  |  | 2-1 | 2-2 | 2-3 | 2-4 | 2-1 | 2-2 |
| Easily adhesive layer | NY6/66 | mass % | 91 | 85 | 70 | 60 | 35 | 50 |
| (B Lyer) | NY6 | mass % | 9 | 15 | 30 | 40 | 65 | 50 |
| Base layer (A Layer) | NY6 | mass % | 100 | 95 | 95 | 95 | 95 | 95 |
|  | NY6/66 | mass % | 0 | 5 | 5 | 5 | 5 | 5 |
| Impact strength |  | J/15 μm | 1.2 | 1.1 | 1.1 | 1.2 | 1.1 | 1.0 |
| Heat shrinkage rate (MD) |  | % | 1.0 | 0.9 | 1.0 | 0.9 | 1.0 | 0.9 |
| Heat shrinkage rate (TD) |  | % | 1.2 | 1.1 | 1.2 | 1.0 | 1.1 | 1.2 |
| Pinhole resistance |  | Number | 5 | 2 | 3 | 3 | 4 | 3 |
| Water resistant laminate strength |  | N/15 mm | 1.4 | 1.3 | 1.2 | 1.2 | 0.5 | 0.5 |
| Oxygen transmission rate |  | ml/m² · day · MPa | 3.2 | 3.3 | 3.1 | 3.5 | 3.6 | 3.5 |

It is clear from the results shown in Table 2 that sufficient water resistant laminate strength can be obtained in the case of the gas barrier polyamide films containing 60 mass % or more of 6/12 copolymer in the easily adhesive layer (B Layer) as Example 2-1 to Example 2-4.

On the one hand, sufficient water resistant laminate strength cannot be obtained in the case where a content amount of Polyamide 6/12 copolymer in the easily adhesive layer (B Layer) was small as Comparative example 2-1 and Comparative example 2-2.

The gas barrier polyamide film of the present invention is described with Examples as described above, and the present invention is not restricted to the embodiments described in the above-described Examples. The embodiments can be appropriately changed without departing from the scope of the invention. For example, the embodiments of each Example can be appropriately combined.

INDUSTRIAL APPLICABILITY

The gas barrier polyamide film of the present invention is excellent in heat resistance, impact resistance, pinhole resistance and water resistance adhesiveness (water resistant laminate strength). Thus, the gas barrier polyamide film can be preferably used for an application as a packaging material such as an application for packaging liquid.

In particular, the gas barrier polyamide film of the present invention can be preferably used for a bag for a pickle, an industrial bag for a liquid cargo or the like.

The invention claimed is:

1. A gas barrier polyamide film, comprising a stretched polyamide film,
   wherein the stretched polyamide film comprises A Layer: a base layer and B Layer: an easily adhesive layer on at least one surface of the A Layer,
   C Layer: an inorganic thin film layer is laminated on the surface of the B Layer in the stretched polyamide film,
   the A Layer comprises 65 mass % or more of Polyamide 6,
   the B Layer consists of 60 to 100 mass % of a Polyamide 6 copolymer and 0 to 40 mass % of Polyamide 6,
   a ratio of a copolymer component in the Polyamide 6 copolymer is 3 to 35 mass %,
   the Polyamide 6 copolymer is Polyamide 6/66 copolymer, Polyamide 6/12 copolymer, Polyamide 6/610 copolymer, or Polyamide 6/11 copolymer, and
   the A Layer, the B Layer, and the C Layer are laminated in the order of A Layer/B Layer/C Layer or B Layer/A Layer/B Layer/C Layer.

2. The gas barrier polyamide film according to claim 1, wherein the A Layer comprises 70 mass % or more of Polyamide 6.

3. The gas barrier polyamide film according to claim 1, wherein the Polyamide 6 copolymer is a Polyamide 6/66 copolymer, and the A Layer comprises 0.5 to 30 mass % of the Polyamide 6/66 copolymer.

4. The gas barrier polyamide film according to claim 1, wherein the Polyamide 6 copolymer is a Polyamide 6/12 copolymer, and the A Layer comprises 0.5 to 30 mass % of the Polyamide 6/12 copolymer.

5. The gas barrier polyamide film according to claim 1, wherein a thickness of the laminated stretched polyamide film is 5 to 30 μm, a thickness of the A Layer is 4.5 μm or more, and a thickness of the B Layer is 0.5 μm or more.

6. The gas barrier polyamide film according to claim 1, wherein water resistant laminate strength is 1.0 N/15 mm or more.

* * * * *